May 31, 1955  M. C. KUEPFER ET AL  2,709,425
DIESEL ENGINE COLD STARTING APPARATUS
Filed Feb. 7, 1950  3 Sheets-Sheet 1

INVENTORS
Matthew C. Kuepfer,
Erwin A. V. Horiak and
Seraphin J. Bouchez

BY

ATTORNEYS

May 31, 1955     M. C. KUEPFER ET AL     2,709,425
DIESEL ENGINE COLD STARTING APPARATUS
Filed Feb. 7, 1950     3 Sheets-Sheet 2

INVENTORS
Matthew C. Kuepfer,
Erwin A. V. Horiak and
Seraphin J. Bouchez
BY
ATTORNEYS May 31, 1955 M. C. KUEPFER ET AL 2,709,425
DIESEL ENGINE COLD STARTING APPARATUS
Filed Feb. 7, 1950 3 Sheets-Sheet 3
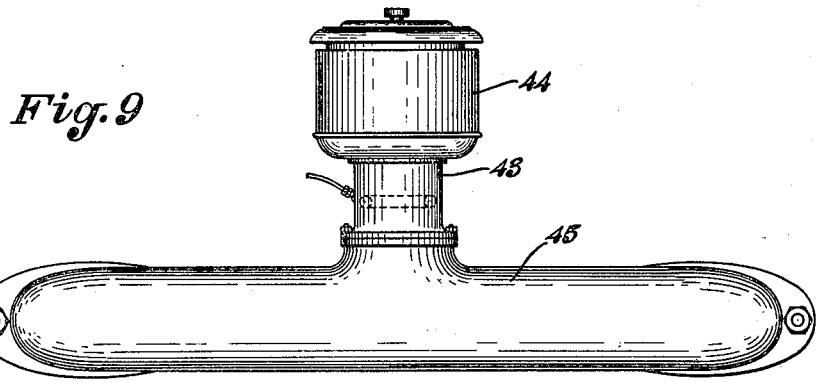
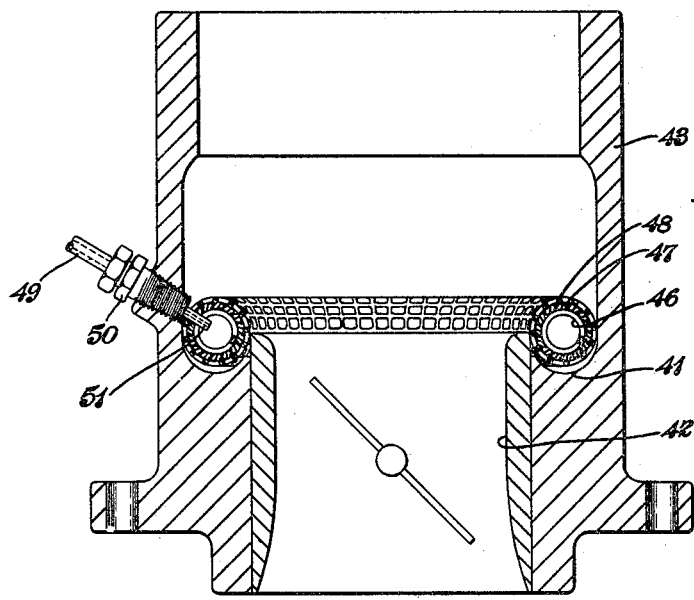
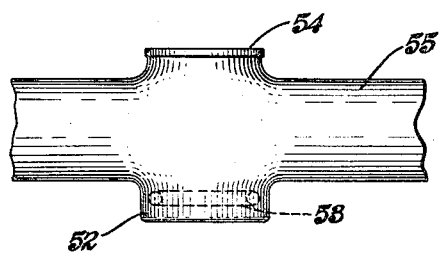
INVENTORS
Matthew C. Kuepfer,
Erwin A. V. Horiak and
Seraphin J. Bouchez
BY Freas and Bishop
ATTORNEYS

United States Patent Office 2,709,425
Patented May 31, 1955

2,709,425
DIESEL ENGINE COLD STARTING APPARATUS

Matthew C. Kuepfer and Erwin A. V. Horiak, Canton, and Seraphin J. Bouchez, Massillon, Ohio, assignors to Hercules Motors Corporation, Canton, Ohio, a corporation of Ohio Application February 7, 1950, Serial No. 142,884

7 Claims. (Cl. 123—187.5)

The invention relates to apparatus for starting diesel engines when extremely cold; and more particularly to apparatus for introducing a volatile hydrocarbon, such as ether in a vaporized state, into the inlet air drawn into the cylinders of a cold diesel engine.

Diesel engines are difficult to start when cold. This difficulty stems not only from the coldness of the engine itself, but also from the low temperature of the cold inlet air, such as when an engine is to be started when surrounding atmospheric temperatures are in the neighborhood of zero. The smaller the engine the more difficult is the problem.

One way of overcoming this difficulty would be to heat the inlet air. Theoretically, the simplest way to heat air is to burn a flame in the air. However, no convenient and practical way of heating the inlet air for a diesel engine by a flame or otherwise has ever been developed; and no convenient, satisfactory and practical manner of starting diesel engines at low temperatures has been known prior to the present invention.

Ether has been used in the past for starting both diesel and gasoline engines. In such use, liquid ether is introduced into the engine inlet manifold. However, it is very dangerous to use ether in this manner because of the possibility of explosion or fire. Attempts have been made, without success, to reduce the element of danger by using an ether-oil combination.

Other attempts have been made to use ether for cold starting diesel engines because it is known that if ether, in a vaporized condition, is breathed into the cylinders of a diesel engine with the inlet air and is there compressed, it will ignite by the heat of compression at a relatively low temperature as compared with the ignition temperature of available diesel fuels.

Such attempts have included the use of sealed capsules of a measured amount of ether, which capsules are punctured by a dispensing device which introduces the liquid ether into the engine intake manifold. By handling the ether in this manner the explosion or fire dangers are reduced, but cold diesel engines started in this manner have been severely damaged. This is because there is poor distribution of the ether to the engine cylinders in spite of attempts to correct the distribution problem by the redesign of carburetors and intake manifolds. Some ether will find its way in liquid form to some of the cylinders and pressures as high as 2,000 lbs. per square inch have resulted in such cylinders. The extreme pressures have caused severe damage to the engines. For instance, the piston ring lands on pistons were actually knocked off. As a result, many diesel engines have been ruined by the use of liquid ether for cold starting the same.

We have discovered that the problem may be solved and the difficulties overcome if ether, when used for cold starting diesel engines, is only introduced into the intake manifold inlet air in a volatilized state as the air is breathed into the engine so that no liquid ether particles can reach the cylinders. In this manner, high pressures in any of the cylinders are avoided and the volatilized ether entrained in the inlet air can properly function to ignite by heat of compression at relatively low temperatures, thus igniting the diesel fuel injected into the usual diesel combustion chamber in the usual manner.

Accordingly, it is a general object of the present invention to provide means for starting a diesel engine when cold in a practical and convenient manner, without the danger of explosion or fire and without damage to the engine.

Furthermore, it is an object of the present invention to provide means for distributing volatilized ether into the inlet air of a diesel engine as it is breathed into the engine so that the volatilized ether and air mixture will ignite by the heat of compression at a low temperature without introducing any liquid ether particles into the engine cylinders.

Also, it is an object of the present invention to provide improved vaporizer means for introducing volatilized ether into the inlet manifold for the inlet air of a diesel engine.

Finally, it is an object of the present invention generally to improve the construction of a diesel engine whereby such engine may be readily started at atmospheric temperatures not only below freezing, but below zero.

These and other objects may be obtained, the described difficulties overcome, the problem solved and new results achieved by the devices, arrangements, constructions, combinations, elements, parts, and vaporizer structures, which comprise the present invention, the nature of which is set forth in the following general statement, preferred embodiments of which—illustrative of the best modes in which applicants have contemplated applying the principles—are set forth in the following description, and which are particularly and distinctly pointed out and set forth in the appended claims forming part hereof.

The nature of the improvements of the present invention may be stated in general terms as including in combination with the inlet manifold of a diesel engine, a vaporizer device including a sump, wick means extending into the sump and presenting a vaporizing surface within said inlet manifold exposed to engine inlet air passing through the manifold, and means for introducing ether into the interior of the wick means whereby volatilized ether is entrained by the engine inlet air passing over the exposed ether-wetted surfaces of the wick means, and whereby liquid ether particles introduced into the wick means collect in said sump and are absorbed therefrom by the wick portions located in said sump.

By way of example, preferred embodiments of the improved diesel engine cold starting apparatus are illustrated in the accompanying drawings forming a part hereof, wherein:

Fig. 9 is a view similar to Figs. 2 and 6 of another modified form of construction in which the vaporizer device is incorporated in the tubular member connecting the inlet air cleaner with the air inlet manifold;

Fig. 10 is an enlarged vertical section illustrating the modified form of vaporizer device shown in Fig. 9; and Fig. 11 is a fragmentary view similar to a portion of Fig. 9, diagrammatically illustrating a still further modified form of construction.

Similar numerals refer to similar parts throughout the various figures of the drawings.

Figure 1:
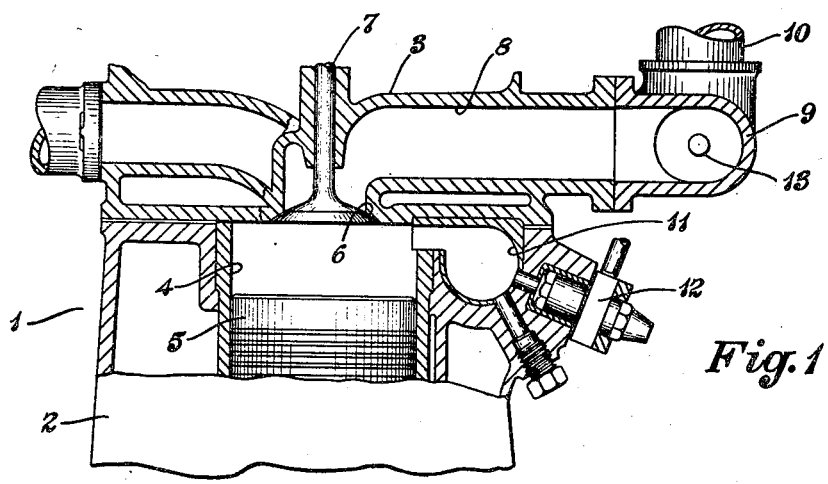
Figure 1 is a transverse sectional view of a portion of a diesel engine provided with one form of improved ether vaporizer construction.

A typical diesel engine is illustrated in Fig. 1 somewhat diagrammatically at 1, and includes, in combination with other usual parts of an internal combustion engine, a cylinder block 2 and a cylinder head 3 mounted at the upper end of the block.

The cylinder block 2 includes walls forming one or more cylinders 4, in each of which a piston 5 is operatively mounted. The cylinder head 3 includes a number of valve openings, an air inlet valve opening being indicated at 6 having a usual air inlet valve 7 operatively associated therewith. An intake passage 8 in the cylinder head 3 communicates with the inlet air valve opening 6 and with an inlet air manifold indicated at 9, having an air inlet duct 10 which may extend to an inlet air cleaner, not shown. A typical diesel engine combustion chamber 11 communicates with cylinder 4 and diesel fuel is injected into the combustion chamber 11 at 12 in a usual manner.

Figure 2:
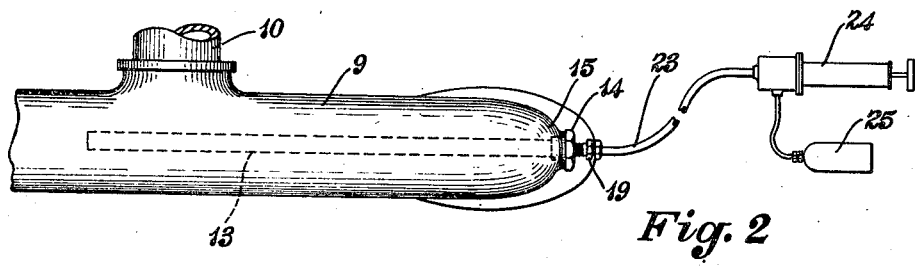
Fig. 2 is a fragmentary, partially diagrammatic, side elevation of the inlet manifold shown in Fig. 1, and of ether pump means connected with the improved inlet manifold vaporizer device.
Figure 3:
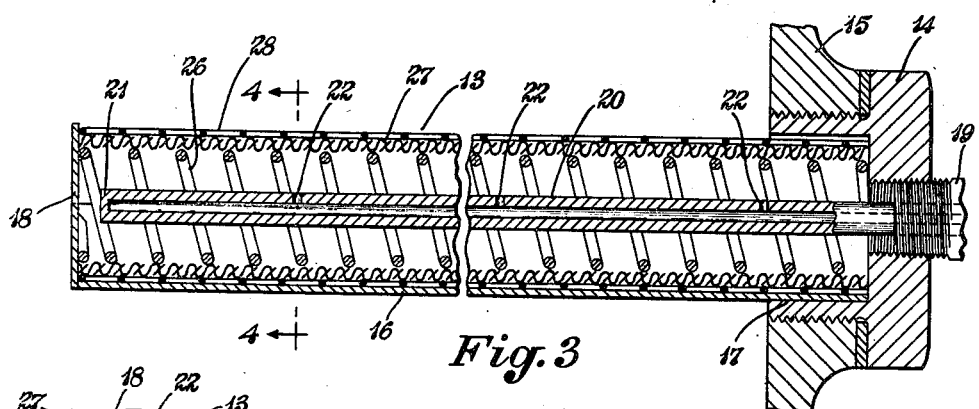
Fig. 3 is an enlarged, vertical longitudinal section through the horizontally arranged vaporizer device illustrated in Figs. 1 and 2.

In accordance with the present invention, a vaporizer device generally indicated at 13 is associated with the intake manifold 9 by threading a flanged mounting plug 14 into a wall portion 15 of the manifold 9, as best illustrated in Figs. 2 and 3.

Figure 4:
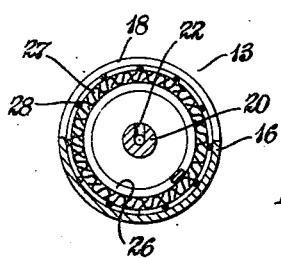
Fig. 4 is a section taken on the line 4—4, Fig. 3.

A trough-like sump 16 is mounted at 17 on plug 14, preferably semi-circular in cross-section, as illustrated in Fig. 4, and extends horizontally along the manifold 9 generally centrally thereof. The trough 16 is closed at its outer free end by a disc-like end plate 18. A coupling and union member 19 is threaded into plug 14, from which an injection tube 20 extends axially of trough 16, the tube 20 being closed off at 21 and having a series of spray ports 22 extending upward therein as shown in Fig. 3.

The injection tube 20 is connected by conduit 23 with a pump 24, which may be mounted on the dashboard of the vehicle to draw a volatile hydrocarbon such as ether from a capsule 25 and to inject the ether into the vaporizer device 13 through the spray openings 22 of the injection tube 20. A helical spring 26 is located within the trough 16 between plug 14 and trough end wall 18 surrounding the injection tube 20.

A number of plies of wide-mesh fabric gauze 27 are wrapped around spring 26, forming wick means for the vaporizer device 13. The lower half of the wick means is located within the trough 16 and the upper semi-circular half of the wick means (Fig. 4) is exposed to inlet air passing through the inlet manifold 9, or in other words, to the atmosphere surrounding the upper half of the wick. The fabric gauze 27 may be formed of any fabric material, such as wool or cotton or nylon or rayon, which will quickly absorb liquid hydrocarbon which may be sprayed toward the gauze from the spray openings 22 or which may collect in the trough 16, so as to present a hydrocarbon-wetted evaporation surface at the upper outer semi-circular wick surface. A wire screen or hardware mesh 28 preferably surrounds the fabric gauze 27 to hold the same in place around spring 26, so as to insure a complete wick covering of injector tube 20 and uniform wick immersion in trough 16.

When it is desired to start the diesel engine 1 at low temperatures, the operator turns over the engine in the usual manner and injects a quantity of ether from supply 25 by pump 24 to the vaporizer device 13. Liquid ether sprays from injection tube 20 through spray apertures 22 and wets the inner surface of the fabric gauze wick 27, excess liquid ether dropping to and collecting in trough 16. Inlet air sucked or breathed into the engine through inlet manifold 9 passes rapidly across the exposed ether-wetted surface of the fabric gauze wick 27, whereby the ether volatilizes and is entrained in the onrushing inlet air drawn into the cylinders. During the compression stroke in any cylinder 4, the volatilized ether and air mixture is compressed and ignites by the heat of compression at a relatively low temperature thereby igniting the diesel fuel injected into combustion chamber 11.

In this manner, the volatilized ether is uniformly distributed in and entrained by the inlet air, and no liquid ether passes into the manifold or can find its way in a liquid state into any cylinder. Meanwhile, the high velocity of the inlet air rushing through the inlet manifold, in passing over the ether-wetted wick surfaces of the vaporizer device, presents ideal conditions for the complete and efficient vaporization of the ether.

Figure 5:
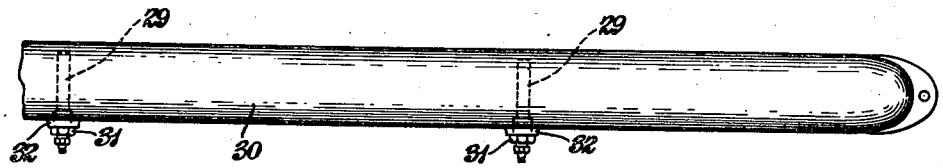
Fig. 5 is a view similar to Fig. 2, illustrating a modified form of vertical vaporizer device.
Figure 6:
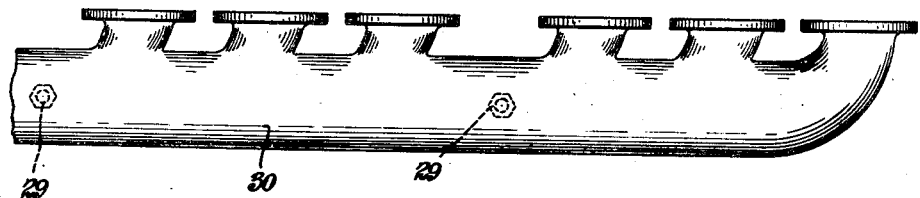
Fig. 6 is a plan view of the parts shown in Fig. 5.

In the embodiments of the invention shown in Figs. 5 through 8, vertical rather than horizontal vaporizer devices are used, a vertical vaporizer being indicated generally at 29. A plurality of devices 29 may be assembled with the inlet air manifold 30, as shown in Figs. 5 and 6, by threading a base plug 31 into the bottom wall 32 of the manifold 30. The interior of the plug 31 provides a cup-shaped recess or sump 33 from which a helical spring 34 extends upwardly, surrounded by fabric gauze wick 35, in turn held in place on spring 34 by hardware wire mesh fabric 36, the lower end of the fabric wick 35 extending downwardly into cup portion 33 of plug 31. An injection tube 37, having spray openings 38 at its upper end, extends upward within the fabric wick 35 from coupling member 39, which may be connected with a pump and ether source (not shown) in the same manner as described and illustrated in Fig. 2.

In the vertical vaporizer 29, liquid ether injected into tube 37 sprays out of spray openings 38 against the inner surface of fabric wick 35 and excess liquid ether trickles or runs down the inner surface of the wick and collects in cup-shaped sump 33. Thus, the exposed outer surface of the fabric wick 35 presents an ether-wetted surface from which ether is vaporized by the rush of inlet air passing through manifold 30. Excess liquid ether which collects in sump 33 provides an ether reservoir from which ether is absorbed by the fabric wick to continue the complete evaporation and vaporization of the ether.

Figures 7, 8:
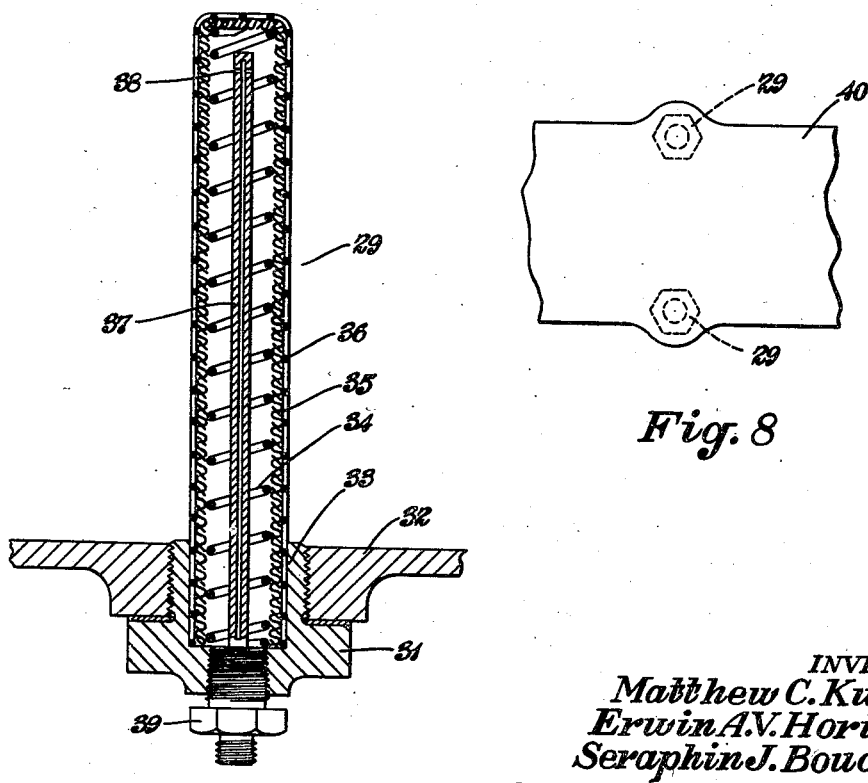
Fig. 7 is an enlarged, vertical, longitudinal section through the vertically arranged vaporizer device shown in Figs. 5 and 6.
Fig. 8 is a fragmentary plan view similar to a portion of Fig. 6, illustrating the use of two vertical vaporizing devices in tandem.

If desired, vertical vaporizers 29 may be located in pairs in tandem within an inlet air manifold 40 as shown in Fig. 8.

Another modified form of vaporizer device is illustrated in Figs. 9 and 10. In this form of device, an annular trough 41 is formed surrounding the upper end of the venturi tube 42 at the bottom of the tubular duct 43 connecting the air cleaner 44 with the inlet air manifold 45. A toroidal-shaped helical spring 46 is located within the annular sump trough 41, surrounded by fabric gauze 47 held in place by wire mesh fabric 48. Liquid ether may be injected in the same manner as shown in Fig. 2, through tube 49, coupling 50 and injector tube 51 to the interior of the fabric gauze wick 47 whereby the ether wets the interior surface of the wick and excess liquid ether collects in sump trough 41. Inlet air sucked into manifold 45 through air cleaner 44, in rushing past the exposed upper surface of the fabric gauze wick 47, vaporizes ether at the ether-wetted surface of the wick, whereby the volatilized ether is entrained in the inlet air and carried into the engine cylinders.

If desired, an annular wick similar to the wick 47 may be located in a depressed recess 52, as at 53 in Fig. 11, opposite the opening 54 in inlet manifold 55 leading from the air cleaner.

The vaporizer devices of the invention have operated satisfactorily and efficiently for starting diesel engines without damage at temperatures as low as 15 degrees below zero.

Accordingly, the present invention provides an improved device for vaporizing ether for starting a diesel engine under extremely cold conditions, provides for the complete vaporization of the ether so that the ether vapors are entrained in a uniform manner in the inlet air for the engine, avoids the possibility of any liquid ether reaching the engine cylinders where it may damage the engine, and generally improves the construction and operation of diesel engines under all sorts of conditions.

The embodiments of the present invention illustrated and described herein are by way of example, and the scope of the invention is not limited to the exact details of construction of the various parts illustrated.

Moreover, the improved volatile hydrocarbon vaporizer arrangement is not limited to use in a diesel engine, even though the greatest difficulties are experienced in attempting to start a diesel engine when extremely cold, but the arrangement is equally adapted for use in facilitating the cold starting of typical internal combustion gasoline engines.

Furthermore, the operation of the improved construction is not limited to the use of ether, which has been specifically referred to in the foregoing detailed description, since other volatile hydrocarbons which can be handled and stored in liquid form may be used in the operation of the improved cold starting construction.

Finally, in the foregoing description, certain terms have been used for brevity, clearness, and understanding; but no unnecessary limitations are to be implied therefrom beyond the requirements of the prior art, because such words are used for descriptive purposes herein and not for the purpose of limitation and are intended to be broadly construed.

Having now described the features of the invention, the construction and operation of preferred embodiments thereof, and the advantageous, new, and useful results obtained by the improved diesel engine hydrocarbon vaporized structure; the new and useful devices, arrangements, constructions, combinations, elements and parts, and reasonable mechanical equivalents thereof obvious to those skilled in the art, are set forth in the appended claims.

We claim:

1. A volatile hydrocarbon vaporizer device adapted for location in the intake manifold of an internal combustion engine, the device including a hollow tubular gauze wick having a longitudinally and circumferentially extending outer exposed surface portion, a perforate liquid spray tube extending longitudinally within and spaced radially from said tubular wick, means for introducing volatile hydrocarbon into said tube, whereby the volatile hydrocarbon is sprayed from said spray tube onto the interior of said tubular wick, and a trough member positioned beneath and receiving the lower portion of said wick for collecting sprayed hydrocarbon which does not volatilize at the surface of the wick and for feeding it to said wick.

2. In a vaporizer for vaporizing volatile hydrocarbons and the like, walls forming a trough, a helical wick sustaining spring in said trough, tubular wick means mounted on and surrounding said spring, the tubular wick means having a portion thereof located in said trough and another portion exposed to the surrounding atmosphere, and spray means within and spaced from said tubular wick means, the spray means including perforations directed for spraying volatile liquid upon said tubular wick means from the interior thereof.

3. In a vaporizer for vaporizing volatile hydrocarbons and the like, walls forming a trough, a helical wick sustaining spring in said trough, tubular wick means mounted on and surrounding said spring, the tubular wick means having a portion thereof located in said trough and another portion exposed to the surrounding atmosphere, means surrounding said wick means confining said wick means about said spring, and means within and spaced from said tubular wick means for spraying volatile liquid upon said tubular wick means from the interior thereof.

4. In a diesel engine, walls forming an air inlet passage, a liquid retaining trough formed in such passage, a hollow tubular wick, means mounting said wick in said air passage with a portion of said wick in said trough and a portion thereof above said trough and exposed to air drawn through said passage, a perforate liquid spray tube extending longitudinally within and spaced from said tubular wick, means for introducing ether into said spray tube, the liquid spray tube having perforations directing sprays of ether onto that portion of said wick above said trough, whereby ether is vaporized at the upper wick portion and entrained in the air passing therethrough, and whereby excess liquid collects in said trough and is fed to that portion of the wick located in the trough.

5. A volatile hydrocarbon vaporizer device adapted for location in the intake manifold of an internal combustion engine, the device including a hollow tubular gauze wick having a longitudinally and circumferentially extending outer exposed surface portion, a perforate liquid spray tube extending longitudinally within and spaced radially from said tubular wick, means for introducing volatile hydrocarbon into said tube, whereby the volatile hydrocarbon is sprayed from said spray tube onto the interior of said tubular wick, and a trough member positioned beneath and receiving the lower portion of said wick for collecting sprayed hydrocarbon which does not volatilize at the surface of the wick and for feeding it to said wick, the means for introducing volatile hydrocarbon into said spray tube including a pump and a container for volatile hydrocarbon, and duct means associating the container and the pump and the spray tube with each other for introducing the volatile hydrocarbon into said tube by operation of said pump.

6. A volatile hydrocarbon vaporizer device as set forth in claim 5, and in which the trough member is provided with a closure at each end thereof and the wick extends between the trough end closures.

7. In a diesel engine, walls forming an air inlet passage, a liquid retaining trough formed in such passage, a hollow tubular wick, means mounting said wick in said air passage with a portion of said wick in said trough and a portion thereof above said trough and exposed to air drawn through said passage, a perforate liquid spray tube extending longitudinally within and spaced from said tubular wick, means for introducing volatile hydrocarbon into said spray tube, the liquid spray tube having perforations directing sprays of ether onto that portion of said wick above said trough, whereby volatile hydrocarbon is vaporized at the upper wick portion and entrained in the air passing therethrough, and whereby excess liquid volatile hydrocarbon collects in said trough and is fed to that portion of the wick located in the trough, the means for introducing volatile hydrocarbon into said spray tube including a pump and a container for volatile hydrocarbon, and duct means associating the container and the pump and the spray tube with each other for introducing the volatile hydrocarbon into said tube by operation of said pump.

References Cited in the file of this patent

UNITED STATES PATENTS

| Number | Name | Date |
|---|---|---|
| 961,423 | Sturtevant et al. | June 14, 1910 |
| 1,070,131 | Holton | Aug. 12, 1913 |
| 1,096,604 | Dale | May 12, 1914 |
| 1,164,931 | De Clairmont | Dec. 21, 1915 |
| 1,338,398 | Richards | Apr. 27, 1920 |
| 1,344,805 | McAssey | June 29, 1920 |
| 1,498,918 | Jensen | June 24, 1924 |
| 2,190,348 | Bach | Feb. 13, 1940 |

FOREIGN PATENTS

| Number | Country | Date |
|---|---|---|
| 148,689 | Great Britain | Aug. 5, 1920 |
| 160,075 | Great Britain | Mar. 17, 1921 |
| 254,359 | Great Britain | July 5, 1926 |
| 242,002 | Switzerland | Sept. 2, 1946 |